(12) United States Patent
Kurita et al.

(10) Patent No.: US 8,643,785 B2
(45) Date of Patent: Feb. 4, 2014

(54) VIDEO PROCESSING APPARATUS AND METHOD FOR CONTROLLING THE SAME

(75) Inventors: Masanao Kurita, Kawasaki (JP); Atsushi Mizutome, Miura-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 12/850,489

(22) Filed: Aug. 4, 2010

(65) Prior Publication Data

US 2011/0043701 A1 Feb. 24, 2011

(30) Foreign Application Priority Data

Aug. 20, 2009 (JP) ................................. 2009-191194

(51) Int. Cl.
*H04N 5/46* (2006.01)

(52) U.S. Cl.
USPC ............ 348/558; 348/448; 348/449; 348/450; 348/451; 348/452

(58) Field of Classification Search
USPC ................. 348/671, 672, 607, 571, 624, 558, 348/448–452
See application file for complete search history.

(56) References Cited

U.S. PATENT DOCUMENTS

| | | | | |
|---|---|---|---|---|
| 5,946,044 A * | 8/1999 | Kondo et al. | ................. | 348/458 |
| 7,995,146 B2 * | 8/2011 | Tomonaga | .................... | 348/581 |
| 2002/0036715 A1 * | 3/2002 | Honda et al. | .................. | 348/672 |
| 2005/0253967 A1 | 11/2005 | Yoshida | | |
| 2006/0132649 A1 * | 6/2006 | Miyazawa | .................... | 348/458 |
| 2006/0268169 A1 * | 11/2006 | Han | .............................. | 348/458 |
| 2006/0274204 A1 * | 12/2006 | Kimura et al. | ................. | 348/558 |
| 2007/0052860 A1 * | 3/2007 | Matsubara et al. | ........... | 348/624 |
| 2008/0174699 A1 * | 7/2008 | Suzuki et al. | ................. | 348/607 |
| 2008/0239154 A1 * | 10/2008 | Yamauchi | ..................... | 348/607 |
| 2010/0220238 A1 * | 9/2010 | Honda | .......................... | 348/663 |
| 2010/0225804 A1 * | 9/2010 | Ota | .............................. | 348/441 |

FOREIGN PATENT DOCUMENTS

| | | |
|---|---|---|
| JP | 2005-328150 A | 11/2005 |
| JP | 2006-339934 A | 12/2006 |
| JP | 2010-199976 A | 9/2010 |

* cited by examiner

*Primary Examiner* — Jefferey Harold
*Assistant Examiner* — Humam Satti
(74) *Attorney, Agent, or Firm* — Canon USA, Inc., IP Division

(57) ABSTRACT

A video processing apparatus determines whether a video signal of a predetermined resolution is a pseudo-resolution video signal generated from a video signal of resolution lower than the predetermined resolution. The video processing apparatus generates a first frequency histogram relating to a video signal of a first resolution among a plurality of video signals which are identical in contents and different from one another in resolution and a second frequency histogram relating to a video signal of a second resolution which is lower than the first resolution, compares the first frequency histogram with the second frequency histogram, compares a similarity between the first frequency histogram and the second frequency histogram with a predetermined threshold value, and determines, if the similarity is equal to or less than the predetermined threshold value, that the video signal of the first resolution is a pseudo-resolution video signal.

12 Claims, 6 Drawing Sheets

FIG. 2

| LAYER ID INFORMATION OF SPACE SCALABILITY N | RESOLUTION LAYER |
|---|---|
| 3 | 8K4K (7680 × 4320) |
| 2 | 4K2K (3840 × 2160) |
| 1 | HD (1920 × 1080) i |
| 0 | SD (720 × 480) i |

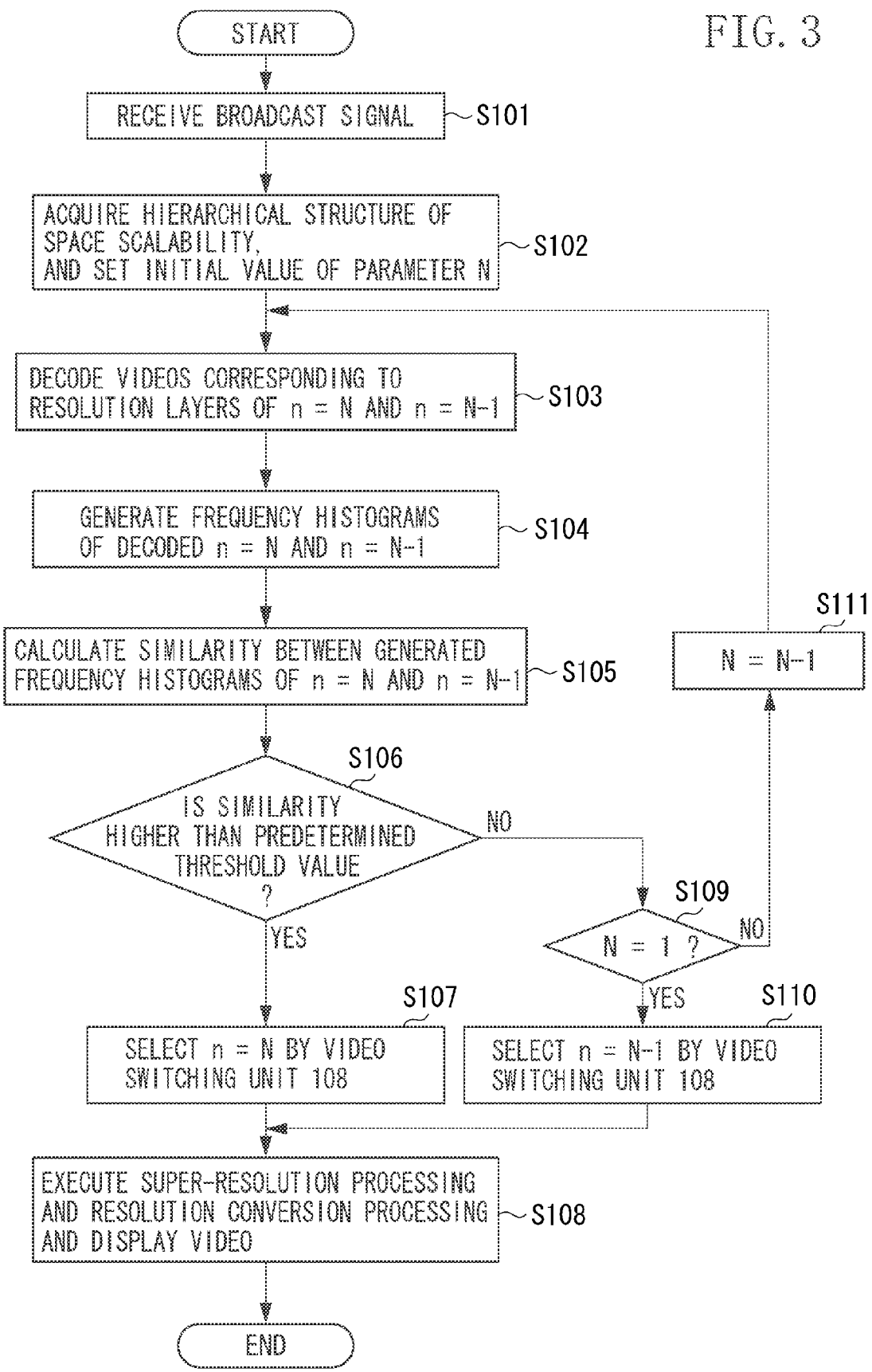

FIG. 5

| RESOLUTION | MAXIMUM SPATIAL FREQUENCY (60Hz) |
|---|---|
| 8K4K (7680×4320) | 1000MHz |
| 4K2K (3840×2160) | 250MHz |
| HD (1920×1080) i | 30MHz |
| SD (720×480) i | 5MHz |

VIDEO PROCESSING APPARATUS AND METHOD FOR CONTROLLING THE SAME

BACKGROUND OF THE INVENTION

1. Field of the Invention

The present invention relates to a video processing apparatus which can generate displayable video data from a video signal which has predetermined resolution among video signals which are identical in contents but different from one another in resolution, and a method for controlling the video processing apparatus.

2. Description of the Related Art

Conventional analog broadcasting has handled mainly videos of Standard Definition (SD) resolution. In current digital broadcasting, however, videos are broadcast with High Definition (HD) resolution based on a high-compression video coding technique in many cases. Thus, in the case of broadcasting contents generated using conventional equipment of SD resolution or past contents of SD resolution, interpolation processing is performed to increase the number of pixels, and a video having only apparent resolution converted into HD resolution may have been distributed. It is assumed that the video thus generated with no substantial resolution is referred to as a pseudo-resolution video. On the other hand, a video which is not processed to improve apparent resolution is referred to as an original resolution video.

There is known a method for determining whether a received video is a pseudo-resolution video by analyzing its spatial frequency. A video captured or generated with HD resolution includes more high frequency components than a video obtained by converting a video of SD resolution into HD resolution in a pseudo manner. Thus, for example, if a spatial frequency does not have a value equal to or more than a specific threshold value, the received video can be determined to be a pseudo-resolution video.

Japanese Patent Application Laid-Open No. 2005-328150 discusses a technique for acquiring a high quality video of HD resolution by down-converting a pseudo-resolution video into a video of SD resolution, and subsequently performing image quality enhancement processing and resolution conversion. In the technique discussed in the above reference, the pseudo-resolution video which does not have substantial resolution needs to be down-converted again. However, as described above, the pseudo-resolution video includes almost no high frequency component as compared with an original pseudo-resolution video equal in resolution to the pseudo-resolution video. More specifically, by using the pseudo-resolution video disadvantageous in image quality as compared with the original resolution video, the video is down-converted again to lower resolution. In consequence, image quality deterioration occurs in the technique discussed in the above reference.

H.246/Scalable Video Coding (SVC) that is a new video coding standard is a result of extending H.264/Advanced Video Coding (AVC) so as to multiplex a plurality of different resolutions on one stream data. A video can be decoded with desired resolution by extracting a part of the stream data.

A video is captured by equipment that can perform photographing with arbitrary original resolution at least. For example, in the case of equipment that can perform photographing with HD resolution, a video of HD resolution becomes an original resolution video. Thus, in broadcasting of videos distributed using the H.264/SVC, a video of one resolution among the videos of several resolutions is an original resolution video. A video having resolution other than the original resolution is a pseudo-resolution video generated from the original resolution video or a down-converted video.

Thus, among pieces of data coded by the H/264/SVC, an original resolution video is decoded to perform image quality enhancement processing and resolution conversion into display resolution. This processing can prevent image quality deterioration that occurs during re-down-conversion of the pseudo-resolution video converted in resolution in a pseudo manner in the conventional technology.

However, in the above described pseudo-resolution video determination method of the conventional technology, certain videos are erroneously detected. For example, in the case of a video such as a cartoon which includes many flat portions and smooth edges, a spatial frequency is originally low, and hence it is difficult to determine whether a video signal is a pseudo-resolution video signal.

SUMMARY OF THE INVENTION

The present invention is directed to a video processing apparatus capable of determining whether a signal is a pseudo-resolution video signal, irrespective of a genre, a type or characteristics of a video, and a method for controlling the video processing apparatus.

According to an aspect of the present invention, there is provided a video processing apparatus which determines whether a video signal of a predetermined resolution is a pseudo-resolution video signal generated from a video signal of resolution lower than the predetermined resolution. The video processing apparatus includes a first generation unit configured to generate a first frequency histogram relating to a video signal of a first resolution among a plurality of video signals which are identical in contents and different from one another in resolution, a second generation unit configured to generate a second frequency histogram relating to a video signal of a second resolution which is lower than the first resolution among the plurality of video signals which are identical in contents and different from one another in resolution, a calculation unit configured to compare the first frequency histogram with the second frequency histogram and calculate a similarity between the first frequency histogram and the second frequency histogram using a predetermined expression, and a determination unit configured to compare the similarity with a predetermined threshold value and determine, if the similarity is equal to or less than the predetermined threshold value, that the video signal of the first resolution is a pseudo-resolution video signal.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example of a hierarchical structure of spatial scalability.

FIG. 3 is a flowchart illustrating processing according to an exemplary embodiment of the present invention.

FIG. 5 illustrates a correspondence relationship table between each resolution and a maximum spatial frequency.

DESCRIPTION OF THE EMBODIMENTS

Various exemplary embodiments, features, and aspects of the invention will be described in detail below with reference to the drawings.

Figure 1:
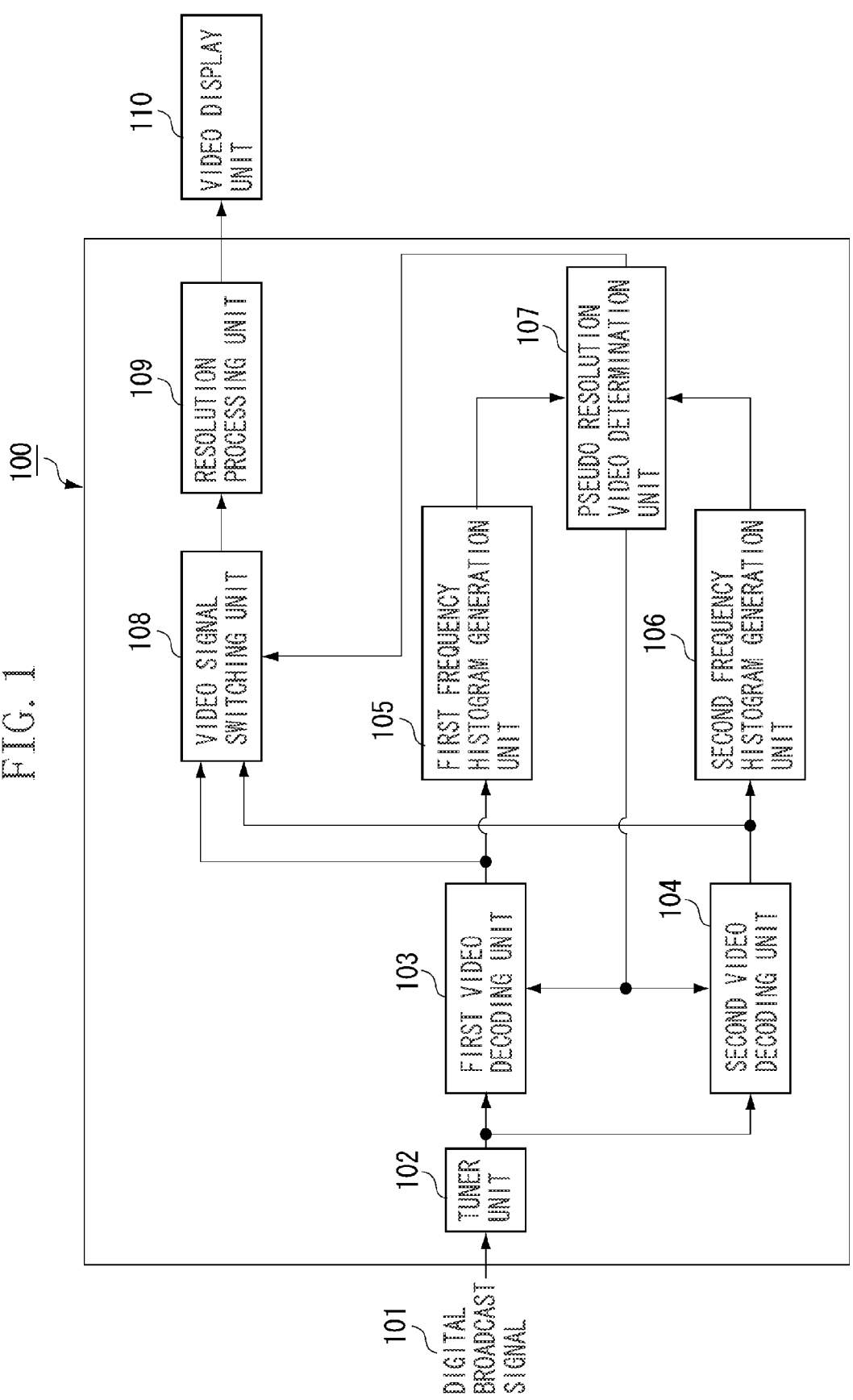
FIG. 1 is a block diagram illustrating a configuration of a video processing apparatus according to the present invention.

FIG. 1 is a block diagram illustrating a configuration of a video processing apparatus 100 to which the present invention can be applied. Though not illustrated, a central processing unit (CPU) responsible for overall control of blocks of the video processing apparatus is connected to each block via a bus (not illustrated).

A digital broadcast signal 101 is input to a tuner unit 102. A Moving Picture Experts Group-2 Transport Stream (MPEG-2 TS) signal of an arbitrary channel is extracted from the input digital broadcast signal 101. The MPEG-2 TS signal in which a video signal coded by the H.264/SVC and an audio signal coded by Advanced Audio Coding (AAC) are multiplexed is separated at the tuner unit 102. It is defined that spatial scalability (selectable resolution) can be set up to eight layers in the video coded by the H.264/SVC.

FIG. 2 is a conceptual diagram illustrating a hierarchical structure of the spatial scalability of the video coded by the H.264/SVC to be transmitted. Hierarchical structure information containing layer identification (ID) information of the spatial scalability illustrated in FIG. 2 and resolution layer information associated therewith are included in a broadcast signal to be transmitted. Information of a selectable resolution layer is contained in a sequence parameter set (SPS) prepared for each layer. The CPU can acquire this information by referring to the SPS. In the present exemplary embodiment, coded data having spatial scalability of four layers in which a resolution layer of layer ID information N=3 is a maximum resolution layer 8K4K (7680*4320 pixels) is transmitted.

The same pieces of video data coded by the H.246/SVC and separated at the tuner unit 102 are respectively input to a first video decoding unit 103 and a second video decoding unit 104. The first video decoding unit 103 selects a resolution layer of n=N to decode the coded video data. The second video decoding unit 104 selects a resolution layer of n=N−1 to decode the coded video data. The parameters n indicate the resolution layers decoded by the first video decoding unit 103 and the second video decoding unit 104.

The CPU notifies the video decoding units of layer ID information N to be processed. More specifically, when the CPU instructs the video decoding units to decode a resolution layer of layer ID information N=3, the first video decoding unit 103 selects a first resolution layer of n=3 to decode the coded video data, and the second video decoding unit 104 selects a second resolution layer of n=2 to decode the coded video data.

The video signal decoded by the first video decoding unit 103 is input to a first frequency histogram generation unit 105 and a video signal switching unit 108. Similarly, the video signal decoded by the second video decoding unit 104 is input to a second frequency histogram generation unit 106 and the video signal switching unit 108. The video signals based on the H.264/SVC have been decoded, and hence these video signals are identical in contents. The first frequency histogram generation unit 105 and the second frequency histogram generation unit 106 respectively generate spatial frequency histograms of the input video signals.

In the present exemplary embodiment, the spatial frequency histogram generated by the first frequency histogram generation unit 105 is referred to as a first frequency histogram. The spatial frequency histogram generated by the second frequency histogram generation unit 106 is referred to as a second frequency histogram. Information about each generated spatial frequency histogram is input to a pseudo-resolution video determination unit 107. A unit for generating a spatial frequency histogram is a frame image unit constituting a video.

The spatial frequency histogram shows, for one frame image constituting a video, a frequency distribution of frequency components included in the frame image. In an image in which pixels constituting the image are almost uniform in a pixel value, a spatial frequency includes many low frequency components. As a result, when a histogram is generated, a histogram shape is acquired in which the number of frequencies on a low frequency side is greater than that on a high frequency side.

On the other hand, in the case of an image of a texture including many edge portions greatly varied in a pixel value, a spatial frequency includes many high frequency components. A histogram shape is accordingly obtained in which the number of frequencies is greater on the high frequency side. As is well-known generally, a spatial frequency of an image can be acquired by executing Fourier transformation on the image.

The pseudo-resolution video determination unit 107 obtains a similarity between the input spatial frequency histograms. Thus, the pseudo-resolution video determination unit 107 determines whether the video signal decoded on the resolution layer of n=N, more specifically, the video signal output from the first video decoding unit, is a video signal generated to increase only apparent resolution.

A determination result of the pseudo-resolution video determination unit 107 is input to the first video decoding unit 103 and the second video decoding unit 104 via the CPU (not illustrated), and used for selecting a resolution layer to be decoded subsequently. The determination result of the pseudo-resolution video determination unit 107 is input to the video signal switching unit 108 to be reflected on switching between the video signals input from the first video decoding unit 103 and the second video decoding unit 104. A method for obtaining the similarity and a method for determining whether the video is a pseudo-resolution video will be described below.

Based on the determination result of the pseudo-resolution video determination unit 107, the video signal selected by the video signal switching unit 108 is input to a resolution processing unit 109. The resolution processing unit 109 performs super-resolution processing to increase a spatial frequency of the video and resolution conversion processing to form an image matched with display resolution (number of display pixels) of a video display unit 110. The video signal thus generated is transmitted to the video display unit 110 to be displayed. In the present exemplary embodiment, the display resolution of the video display unit 110 is based on a super hi-vision standard of 8K4K (7680*4320 pixels).

Referring to a flowchart illustrated in FIG. 3, a control procedure performed by the video processing apparatus 100 configured as illustrated in the above block diagram will be described. In step S101, the tuner unit 102 extracts a MPEG-2 TS signal of an arbitrary channel from the received digital broadcast signal 101. The tuner unit 102 further separates a video signal coded by the H.264/SVC from the extracted MPEG-2 TS signal.

In step S102, the CPU acquires hierarchical structure information about spatial scalability by referring to the SPS of the video signal coded by the H.264/SVC. The CPU sets an initial value of the layer ID information N so as to determine the resolution layers to be decoded by the first video decoding unit 103 and the second video decoding unit 104, more specifically, parameters n.

In the present exemplary embodiment, for the initial value of the layer ID information N, a maximum value of the layer ID information N about the spatial scalability defined by the hierarchical structure information is compared with a value of the layer ID information corresponding to a resolution layer equal to the display resolution of the video display unit 110. As a result of the comparison, the CPU sets a larger value as an initial value of the layer ID information N.

In the present exemplary embodiment, a maximum value of the layer ID information N of the spatial scalability defined by the hierarchical structure information is N=3, display resolution is 8K4K, and a value of the layer ID information N corresponding to the resolution layer is 3. Hence, the CPU sets an initial value to 3.

In step S103, the first video decoding unit 103 and the second video decoding unit 104 execute decoding processing of the data coded by the H.264/SVC. The CPU has determined the initial value to be N=3 in step S102, and hence given information of the initial value, the first video decoding unit 103 decodes a video of 8K4K resolution that is a resolution layer equivalent to n=N=3. Similarly, the second video decoding unit decodes a video of 4K2K resolution that is a resolution layer equivalent to n=N−1=2.

Figure 4A:
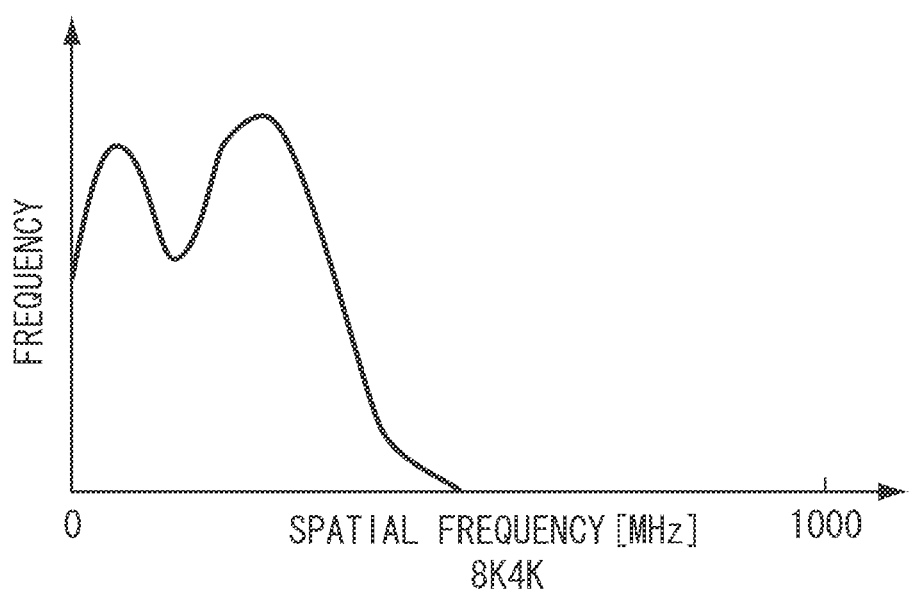
FIGS. 4A and 4B schematically illustrate frequency distributions according to image resolution.

In step S104, the video signal of 8K4K resolution decoded by the first video decoding unit 103 is input to the first frequency histogram generation unit 105. The first frequency histogram generation unit 105 generates a first frequency histogram. FIG. 4A illustrates the first frequency histogram.

Figure 4B:
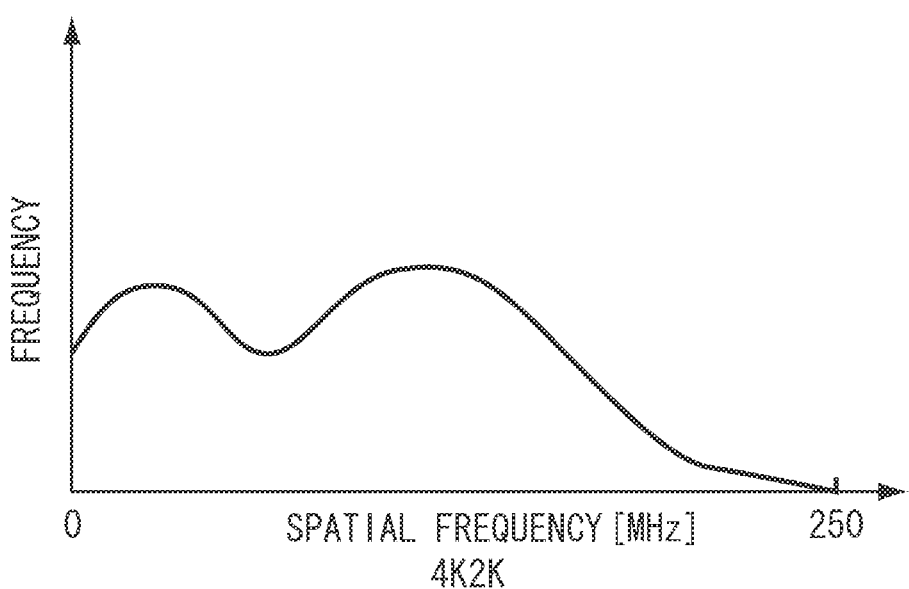

The video signal of 4K2K resolution decoded by the second video decoding unit 104 is input to the second frequency histogram generation unit 106. The second frequency histogram generation unit 106 generates a second frequency histogram. FIG. 4B illustrates the second frequency histogram. A horizontal axis indicates spatial frequencies ranging from a frequency 0 to a predetermined maximum spatial frequency corresponding to each resolution.

As illustrated in FIG. 5, a maximum spatial frequency that image data of each resolution can take varies from one resolution to another. FIG. 5 illustrates a correspondence relationship table between each resolution and a maximum spatial frequency that image data of the resolution can take. The maximum spatial frequency is a frequency reproducible from a clock frequency of each resolution. When a frame rate is 60 Hz, in calculation, a frequency is about 1000 MHz in the case of 8K4K resolution, and a frequency is about 250 MHz in the case of 4K2K resolution.

For example, while a clock frequency fs of HD resolution (1920*1080i) of interface is 74.25 MHz, an upper limit of resolution reproducible by this clock frequency, more specifically, a maximum spatial frequency is defined as Nyquist frequency, and hence its value is fs/2. In other words, in the case of HD resolution, the Nyquist frequency is about 37 MHz. However, a slight band limit is placed on the Nyquist frequency to provide a margin, and hence the maximum spatial frequency is generally set to about 30 MHz in the case of HD resolution.

By using the maximum spatial frequency of HD resolution, the maximum spatial frequencies of other resolutions can be obtained. For example, in the case of 4K2K resolution, the maximum spatial frequency is four times as high as that of HD resolution. In the case of a progressive image, the maximum spatial frequency is about 240 MHz that is 4*2 of the maximum spatial frequency of HD resolution of the interface. In the present exemplary embodiment, for easier calculation, the maximum spatial frequency of 4K2K resolution is set to 250 MHz. Similarly, in the case of 8K4K resolution, the maximum spatial frequency is four times as high as that of 4K2K resolution, and hence set to 1000 MHz. In general resolution conversion processing using normal interpolation processing, no frequency component higher than the Nyquist frequency of the original image can be acquired while the number of pixels can be increased.

In step S105, the first frequency histogram generated by the first frequency histogram generation unit 105 and the second frequency histogram generated by the second frequency histogram generation unit 106 are input to the pseudo-resolution video determination unit 107. The pseudo-resolution video determination unit 107 calculates a similarity between the frequency histograms. A Histogram Intersection method is used for similarity calculation between spatial frequency histograms. The following expression (1) is for calculating a similarity:

$$Sim(H_{n=N}, H_{n=N-1}) = \sum_{n=1}^{M} \min[H_{n=N}(m), H_{n=N-1}(m)] / \sum_{n=1}^{M} H_{n=N}(m) \quad (1)$$

In the expression, Sim (Hn=N, Hn=N−1) indicates a similarity between a histogram of n=N (first frequency histogram) and a histogram of n=N−1 (second frequency histogram). Hn=N (m) and Hn=N−1 (m) respectively indicate frequencies of the first frequency histogram and the second frequency histogram in the spatial frequency m, and min[x, y] indicates minimum values of Hn=N (m) and Hn=N−1 (m). A parameter M is a value of horizontal axis in the histogram, more specifically, a grade value when the maximum spatial frequency is divided by predetermined resolution. For example, when resolution is 8 bits, the parameter M is 256.

The similarity calculated by the expression (1) using the above values approaches one if the first frequency histogram and the second frequency histogram are similar to each other, and approaches zero if not similar.

As described above, even when the number of pixels is increased so that a video signal of predetermined resolution R can have resolution Ru higher than the predetermined resolution, the video signal of resolution Ru does not include many high frequency components not provided in the case of the resolution R. It is because the video signal of the resolution R used for generating the video signal of the resolution Ru does not include frequency of a range exceeding a maximum spatial frequency of resolution R in the first place.

According to such idea, in step S106, based on the similarity calculated by the expression (1), the pseudo-resolution video determination unit 107 determines whether the video signal of the resolution layer decoded by the first video decoding unit 103 is a pseudo-resolution video. If the video signal of the resolution layer decoded by the first video decoding unit 103 is the pseudo-resolution video, the first frequency histogram of the resolution layer decoded by the first video decoding unit 103 includes almost no high frequency component at the resolution as compared with the second frequency histogram. Hence, the similarity is lower.

On the other hand, if the video signal of the resolution layer decoded by the first video decoding unit 103 is not the pseudo-resolution video, more specifically, if the video signal is the original resolution video, there are high frequency components at the resolution as compared with the second frequency histogram. Hence, the similarity is higher. Thus, the pseudo-resolution video determination unit 107 determines that the video signal decoded by the first video decoding unit is the pseudo-resolution video if the similarity is equal to or less than a predetermined threshold value Th, and determines that the video signal is not the pseudo-resolution video if the similarity is higher than the threshold value Th. The threshold value Th is set to, for example, 0.8.

Figure 6A:
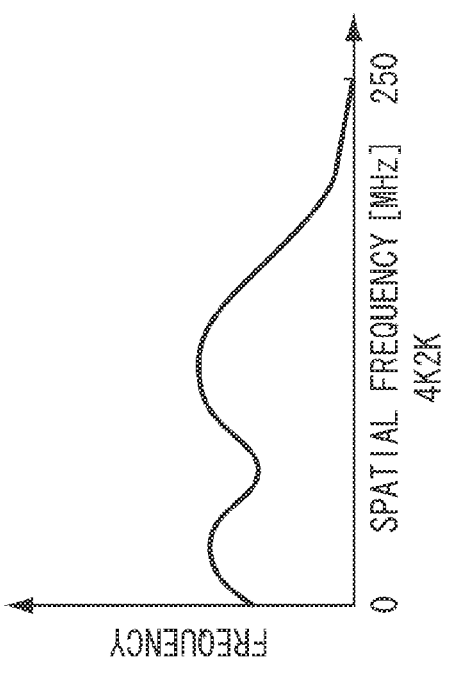
FIGS. 6A to 6D illustrate similarities calculated from spatial frequency histograms according to image resolution.
Figure 6B:
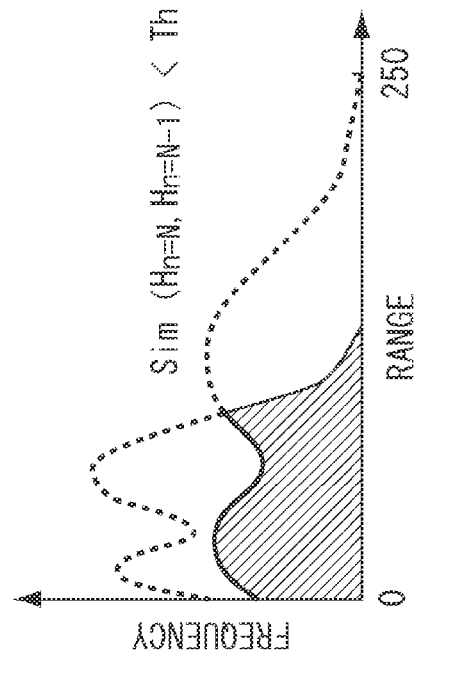
Figure 6C:
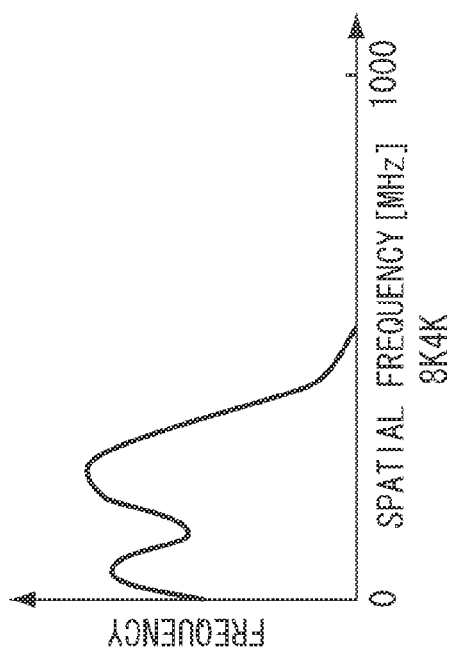

FIGS. 6A to 6D illustrate the similarities calculated from the spatial frequency histograms of 8K4K resolution and 4K2K resolution, which are lower than the threshold value Th. FIG. 6A illustrates the spatial frequency histogram of the video signal of 8K4K resolution. FIG. 6B illustrates the spatial frequency histogram of the video signal of 4K2K resolution. FIG. 6C illustrates the spatial frequency histogram of the video signal of HD resolution.

Figure 6D:
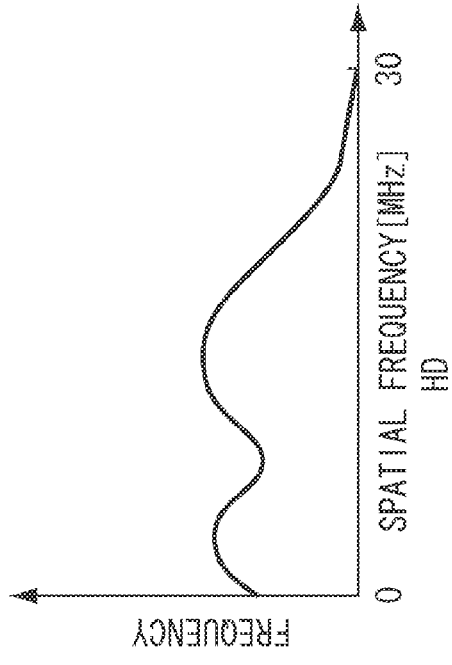

A shaded portion in FIG. 6D is an overlapped portion between the spatial frequency histograms in FIG. 6A and FIG. 6B. An area of the shaded portion is proportional to the similarity. More specifically, when the area of the shaded portion is smaller than a predetermined area, in other words, when the similarity is lower than the threshold value Th, n=N=3, i.e., the video signal of 8K4K resolution is determined to be the pseudo-resolution video.

Thus, comparison of the similarities among the frequency histograms of a plurality of pieces of the resolution in the same video enables determination as to whether the video signal is the pseudo-resolution video, irrespective of a genre, a type or characteristics of the video. In order to compare the similarities, respective original frame images for generating the first and the second frequency histograms can be identical frame images. As a method for identifying the identical frame images, a well-known technique such as a technique for determining coincidence between timestamps added to the frame images can be applied.

Returning to FIG. 3, when the pseudo-resolution video determination unit 107 determines that the video signal of the resolution layer of 8K4K resolution is the pseudo-resolution video (NO in step S106), then the processing proceeds to step S109. In step S109, the CPU determines whether N=1 is set. In the described case, N=3 is set (NO is step S109), so that the processing proceeds to step S111. In step S111, the CPU decrements the value of N by 1, and the processing returns to step S103.

In steps S103 to S106, the processing is performed again with N=2. More specifically, the similarity is obtained between the spatial frequency histograms respectively generated from the video signal of the resolution layer of 4K2K resolution of n=2 and the video signal of the resolution layer of HD resolution of n=1. Then, the pseudo-resolution video determination unit 107 determines whether the video signal of the resolution layer of 4K2K resolution is the pseudo-resolution video.

As illustrated in FIG. 6B and FIG. 6C, the similarity is high between the spatial frequency histogram generated from the video signal of the resolution layer of 4K2K resolution and the spatial frequency histogram generated from the video signal of the resolution layer of HD resolution. More specifically, it can be determined that the video of 4K2K resolution is the original resolution video, and the video of the HD resolution has been generated by down-converting the video of 4K2K resolution. If the video signal of the resolution layer of 4K2K resolution is determined as the original resolution video rather than the pseudo-resolution video (YES in step S106), the CPU advances the processing to step S107.

In step S107, the pseudo-resolution video determination unit 107 transmits, to the video signal switching unit 108, a selection signal for selecting a video signal to be transmitted to the resolution processing unit 109. The selection signal serves as a signal to control which of the video signals decoded by the first video decoding unit 103 and the second video decoding unit 104 and are input to the video signal switching unit 108 will be transmitted to the resolution processing unit 109.

In the above described exemplary embodiment, the video signal of the resolution layer of 4K2K resolution is determined as the original resolution video rather than the pseudo-resolution video. Thus, the pseudo-resolution video determination unit 107 transmits, to the video signal switching unit 108, the selection signal for transmitting the video signal input from the first video decoding unit 103 to the resolution processing unit 109.

In step S108, the resolution processing unit 109 executes super-resolution processing to increase the spatial frequency of the video and resolution conversion processing to match the resolution of the video signal with display resolution of the video display unit 110. The processed video signal is transmitted to the video display unit 110, and displayed on the video display unit 110, so that the processing flow of the present exemplary embodiment ends. If resolution of the video signal selected by the video signal switching unit 108 matches the display resolution of the video display unit 110, the resolution processing unit 109 transmits the input video signal to the video display unit 110 without performing any processing.

In the case of N=1 (YES in step S109), it means that the pseudo-resolution video determination unit 107 has determined that the video signal of HD resolution of n=N=1 is the pseudo-resolution video. This status corresponds to a case where the video signal of the resolution layer decoded by the second video decoding unit 104 is a video signal of the lowest resolution and the video signal of the resolution layer decoded by the first video decoding unit 103 is the pseudo-resolution video.

The pseudo-resolution video determination unit 107 consequently determines that the video signal of the resolution layer of SD resolution of N=0 is the original resolution video. As a result, in step S110, the video signal switching unit 108 selects a video decoded by SD resolution of n=N−1=0.

In the super-resolution processing, different from above described the resolution conversion processing based on the normal interpolation processing, a high frequency component equal to or more than Nyquist frequency can be restored. However, if the video signal subjected to the super-resolution processing is the pseudo-resolution video, a high frequency component originally included in the resolution is lost. Therefore, even if the super-resolution processing is performed using the video, image quality is not improved so greatly.

On the other hand, no high frequency component is lost in the original resolution video that is not the pseudo-resolution video. Hence, when the super-resolution processing is performed using the video, the video signal clearer than the pseudo-resolution video can be generated. Thus, by accurately determining the original resolution video, a high quality image video in which a greater super-resolution processing effect is achieved can be provided to the user.

The contents of the present exemplary embodiment have been described. According to the configuration and the control of the present exemplary embodiment, whether a video is a pseudo-resolution video can be determined irrespective of a genre, a type or characteristics of the video. Whether the video is the pseudo-resolution video, in other words, whether the video is an original resolution video, can be determined. As a result, the original resolution video which can be expected to achieve image quality enhancement effects greater than the pseudo-resolution video can be selected as a target video of the image quality enhancement processing.

The above exemplary embodiment has been described based on the video data coded by the H.264/SVC. However, the present invention is not limited to this coding method. For example, the present invention can be applied to a case where the same video is transmitted by a plurality of resolutions, such as a case where a video of HD resolution is transmitted in a broadcast wave and the same video of 4K2K resolution is transmitted via a network.

In the above described exemplary embodiment, the resolution layers of n=N and n=N−1 are compared with each other. More specifically, comparison targets are resolutions adjacent to each other. However, the present invention is not limited to this comparison processing. Video signals different in resolution may be sequentially compared. As a result, a pseudo-resolution video signal and an original resolution video signal can be determined.

Further in the above described exemplary embodiment, the comparison determination processing is started from the video signal of the highest resolution. However, the present invention is not limited to this comparison processing. The comparison determination processing may be started from a video signal of any resolution. For example, in the resolution layer illustrated in FIG. 2, the video signal of SD resolution and the video signal of HD resolution may be compared first.

In this case, even if a histogram similarity is high between the video signals of SD resolution and HD resolution, the video signal of HD resolution is not necessarily an original resolution video. It is because, for example, when the video signal of 4K2K resolution is assumed to be the original resolution video, the histogram similarity is higher between the video signals of HD resolution and SD resolution which are respectively generated by down-conversion of the video signal of 4K2K resolution. Thus, processing for determining that a video signal of the highest resolution among the video signals of resolutions high in similarity is the original resolution video may be executed.

For example, when the similarity is determined high between the video signals of SD resolution and HD resolution, whether there is any video signal higher in resolution than the HD resolution is determined. If there is the video signal higher in resolution, a histogram similarity is determined between the video signal of HD resolution and the video signal of 4K2K resolution. Further, the histogram similarity is determined between the video signal of 4K2K resolution and the video signal of 8K4K resolution. The video signal of the highest resolution is the video signal of 4K2K resolution among the video signals determined to be high in similarity. As a result, the video signal of 8K4K resolution can be determined as the pseudo-resolution video signal, and the video signal of 4K2K resolution can be determined as the original resolution video signal.

As apparent from the foregoing, according to the present invention, whether a video signal is a pseudo-resolution video signal can be determined irrespective of a genre, a type or characteristics of a video.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-191194 filed Aug. 20, 2009, which is hereby incorporated by reference herein in its entirety.

What is claimed is:

1. A video processing apparatus which determines whether video data of a predetermined resolution is a pseudo-resolution video data generated from a video data of resolution lower than the predetermined resolution, the video processing apparatus comprising:

a receiving unit configured to receive a plurality of video data which are identical in contents and different from one another in resolution, the plurality of video data including a video data of a first resolution and a video data of a second resolution which is lower than the first resolution;

a first generation unit configured to generate a first special frequency histogram relating to the video data of the first resolution;

a second generation unit configured to generate a second special frequency histogram relating to the video data of the second resolution;

a determination unit configured to determine whether the video data of the first resolution is the pseudo-resolution video data or an original-resolution video data based on the first special frequency histogram and the second special frequency histogram;

a selecting unit configured to select the video data of the first resolution for outputting to a display unit in a case where the video data of the first resolution is determined to be the original-resolution video data and select the video data of the second resolution or a video data of a resolution lower than the second resolution for outputting to the display unit in a case where the video data of the first resolution is determined to be the pseudo-resolution video data; and a resolution processing unit configured to execute resolution conversion processing for the video data that is selected by the selecting unit based on a resolution of the selected video data and a resolution of the display unit.

2. A method for controlling a video processing apparatus which determines whether video data of a predetermined resolution is a pseudo-resolution video data generated from a video data of resolution lower than the predetermined resolution, the method comprising:

receiving a plurality of video data which are identical in contents and different from one another in resolution, the plurality of video data including a video data of a first resolution and a video data of a second resolution which is lower than the first resolution;

generating a first special frequency histogram relating to the video data of the first resolution;

generating a second special frequency histogram relating to the video data of the second resolution;

determining whether the video data of the first resolution is the pseudo-resolution video data or an original-resolution video data based on the first special frequency histogram and the second special frequency histogram;

selecting the video data of the first resolution for outputting to a display unit in a case where the video data of the first resolution is determined to be the original-resolution video data and select the video data of the second resolution or a video data of a resolution lower than the second resolution for outputting to the display unit in a case where the video data of the first resolution is determined to be the pseudo-resolution video data; and executing resolution conversion processing for the video data that is selected by the selecting step based on a resolution of the selected video data and a resolution of the display unit.

3. The video processing apparatus according to claim 1, the determination unit configured to calculate a similarity between the first special frequency histogram and the second special frequency histogram using a predetermined expression, and determine, if the similarity is equal to or less than the predetermined threshold value, that the video data of the first resolution is the pseudo-resolution video signal.

4. The video processing apparatus according to claim 3, the determination unit configured to determine, if the similarity is higher than the predetermined threshold value, that the video data of the first resolution is the original-resolution video data.

5. The video processing apparatus according to claim 4, wherein the resolution processing unit is configured to execute resolution processing that increases the spatial frequency for the video data that is selected by the selecting unit.

6. The video processing apparatus according to claim 1, the video signal of the first resolution is the video signal which has a highest resolution among the plurality of the video signals data.

7. The method for controlling a video processing apparatus according to claim 2, further comprising calculating a similarity between the first special frequency histogram and the second special frequency histogram using a predetermined expression, and determining, if the similarity is equal to or less than the predetermined threshold value, that the video data of the first resolution is the pseudo-resolution video signal.

8. The method for controlling a video processing apparatus according to claim 7, further comprising determining, if the similarity is higher than the predetermined threshold value, that the video data of the first resolution is the original-resolution video data.

9. The method for controlling a video processing apparatus according to claim 8, further comprising wherein the executing step is configured to execute resolution processing that increases the spatial frequency for the video data that is selected by the selecting unit.

10. The method for controlling a video processing apparatus according to claim 2, the video signal of the first resolution is the video signal which has a highest resolution among the plurality of the video signals data.

11. The video processing apparatus according to claim 1, wherein the receiving unit configured to receive the plurality of video data which is multiplexed according to Scalable Video Coding standard.

12. The method for controlling a video processing apparatus according to claim 2, wherein the receiving step configured to receive the plurality of video data which is multiplexed according to Scalable Video Coding standard.

* * * * *